United States Patent
Reas et al.

(10) Patent No.: US 10,809,983 B1
(45) Date of Patent: Oct. 20, 2020

(54) USING AN ABSTRACT SYNTAX TREE FOR GENERATING NAMES IN SOURCE CODE

(71) Applicant: Amazon Technologies, Inc., Seattle, WA (US)

(72) Inventors: Russell Reas, Seattle, WA (US); Neela Sawant, Jersey City, NJ (US); Srinivasan Sengamedu Hanumantha Rao, Seattle, WA (US)

(73) Assignee: Amazon Technologies, Inc., Seattle ( * ) Notice: Subject to any disclaimer, the term of this patent is extended or adjusted under 35 U.S.C. 154(b) by 0 days.

(21) Appl. No.: 16/198,980

(22) Filed: Nov. 23, 2018

(51) Int. Cl.
*G06F 8/41* (2018.01)

(52) U.S. Cl.
CPC .................................. *G06F 8/42* (2013.01)

(58) Field of Classification Search
CPC ..... G06F 8/20; G06F 8/30; G06F 8/34; G06F 11/3636; G06F 16/35; G06F 16/84; G06F 16/285
See application file for complete search history.

(56) References Cited

U.S. PATENT DOCUMENTS

| | | | | |
|---|---|---|---|---|
| 2008/0307400 A1* | 12/2008 | Dalal | ...................... | G06F 17/27 717/142 |
| 2012/0151457 A1* | 6/2012 | Gennard | .................. | G06F 8/433 717/146 |
| 2013/0104112 A1* | 4/2013 | Novillo | ...................... | G06F 8/42 717/151 |
| 2013/0268916 A1* | 10/2013 | Misra | ........................ | G06F 8/74 717/123 |
| 2014/0372982 A1* | 12/2014 | Chan | ......................... | G06F 8/72 717/121 |
| 2017/0371629 A1* | 12/2017 | Chacko | ..................... | G06F 8/36 |

OTHER PUBLICATIONS

Alon, Uri, et al.; code2vec: Learning Distributed Representations of Code; Apr. 22, 2018; downloaded from the Internet on Nov. 23, 2018; https://arxiv.org/abs/1803.09473; 25 pages.

* cited by examiner

*Primary Examiner* — Wei Y Zhen
*Assistant Examiner* — Amir Soltanzadeh
(74) *Attorney, Agent, or Firm* — Nicholson De Vos Webster & Elliott

(57) ABSTRACT

Techniques for suggesting a name from one or more code files are described. An exemplary method includes receiving a request to suggest one or more names for a name in a code file; determining one or more names based on existing names in one or more code files using one or more abstract syntax trees (ASTs) for the one or more code files; and outputting the determined one or more names as a name suggestion that comprises novel sequences of sub-tokens of existing names of the one or more code files.

18 Claims, 13 Drawing Sheets

US 10,809,983 B1

USING AN ABSTRACT SYNTAX TREE FOR GENERATING NAMES IN SOURCE CODE

BACKGROUND

The choice of what name to use in code is important. Names of variables, functions, classes, etc. all give clues to a code reviewer as to what the code is trying to accomplish. Unfortunately, it is not a trivial task to come up with these names and/or ensure that they have not been reused in a non-optimal manner.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for suggesting names (such as unseen names) in source code are described. Unlike natural language, source code contains many words/tokens that have never been seen before. That is, these words/tokens are generated on-the-fly by those writing the code and may involve non-local information to create a name that is accepted as good or descriptive. Unfortunately, this on-the-fly generation may lead to the unintentional reuse of words/tokens in an undesirable way. For example, multiple methods and/or variables that have the same name may cause errors in the code, or confusion when the code is reviewed.

Prior approaches to addressing duplicative names involved the use graph-based models or use of an abstract syntax tree (AST) path attention model to predict previously seen names when appropriate for a new method or variable in a previously unseen snippet of code. Unfortunately, these approaches are slow due to the use of graphs and they do not suggest unseen names to use or names based on existing sub-tokens.

Detailed herein are embodiments that avoid the slowness of any graph based models. For example, as detailed herein, source code is sub-tokenized (e.g., SomeHTMLCode is sub-tokenized to some, html, and code) and one or more embedding applications to the sub-tokens are combined with the result of AST path embeddings (embeddings learned for path tokens (i.e., unique paths between sub-tokens in the AST). The path and sub-token embedding results are combined and fed to an attention network to apply attention weights. The weighted, combined embedding results are passed to an output recurrent layer that generates novel sequences of sub-tokens that can then be combined to a name or otherwise leveraged to generate new code pieces.

Figure 1:
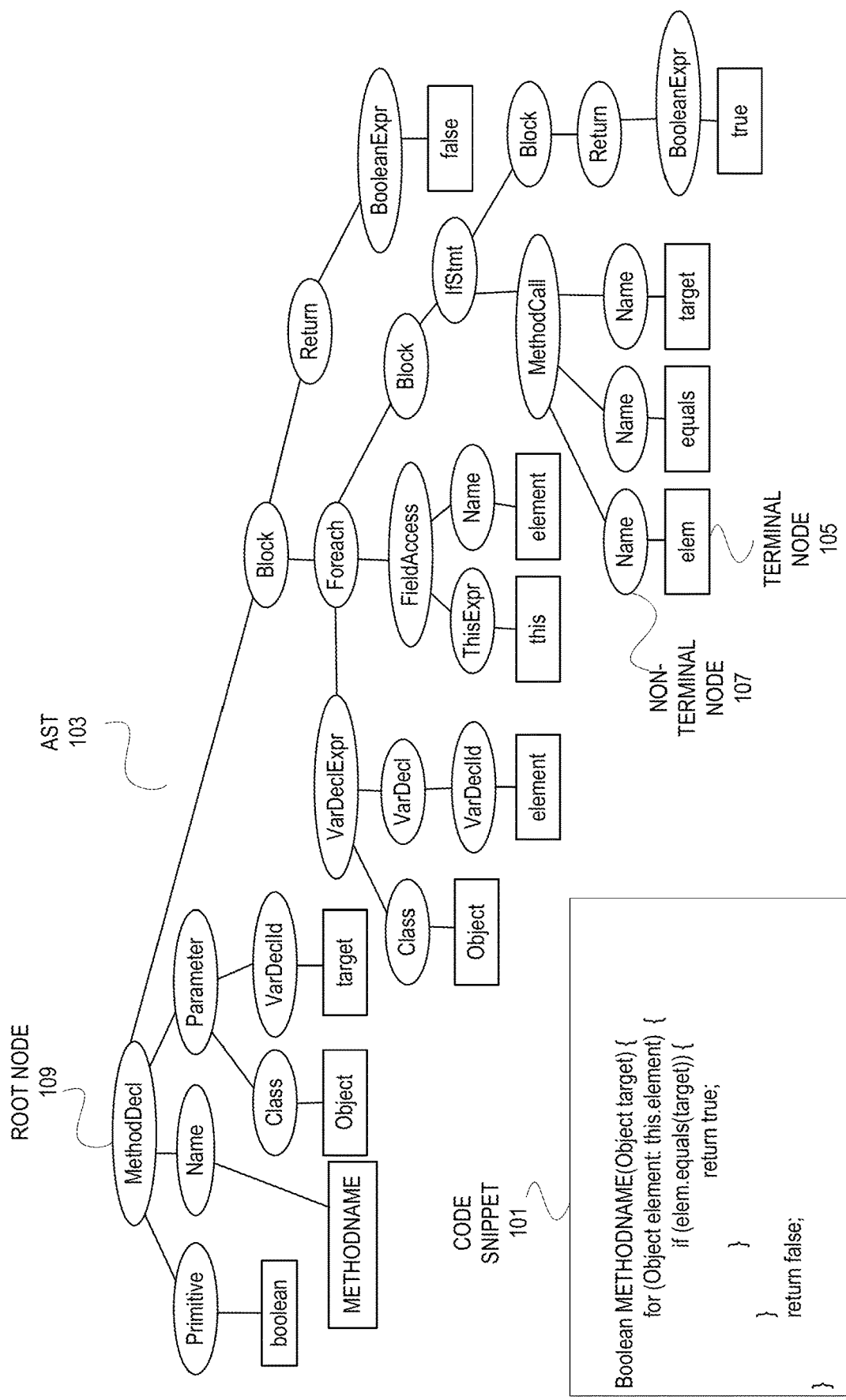
FIG. 1 illustrates an example of a code snippet and an AST for that code snippet.

FIG. 1 illustrates an example of a code snippet and an AST for that code snippet. As shown, the code snippet 101 in this example is a JAVA method that has a single parameter named target that iterates over a field name elements that has an "if" condition.

The AST 103 is a tuple of (N, T, X, s, δ, φ) where N is a set of nonterminal nodes (such as non-terminal node 107), T is a set of terminal nodes (such as terminal node 105), X is a set of values, s∈N is the root node (such as root node 109), δ:N→(N∪T)* is a function that maps a nonterminal node to a list of its children, and φ:T→X is a function that maps a terminal node to an associated value. Every node except the root appears exactly once in all the lists of children. In some embodiments, an AST is created by parsing all of the methods of a code snippet.

An AST path is a path between nodes in the AST, starting from one terminal, ending in another terminal, passing through an intermediate nonterminal in the path which is a common ancestor of both terminals. AST paths are used to capture regularities that reflect common code patterns. In some embodiments, an AST path is represented as a sequence of AST nodes, linked by up and down arrows, which symbolize the up or down link between adjacent nodes in the tree.

Figure 2:
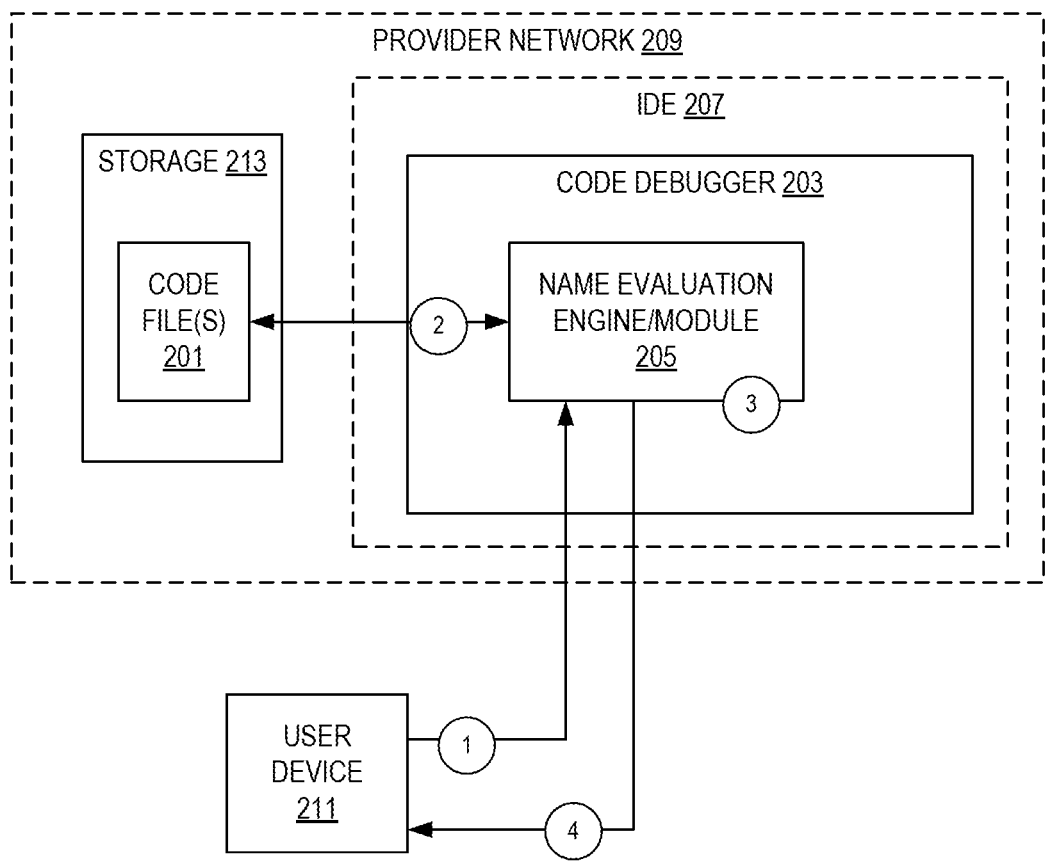
FIG. 2 illustrates embodiments of systems utilizing a name suggestion entity.

FIG. 2 illustrates embodiments of systems utilizing a name suggestion entity. A code debugger 203 evaluates one or more code files(s) 201 (such as high-level programming language source code) in storage 213 to find and (hopefully) resolve issues in the one or more code file(s). In some embodiments, as a part of debugging, a name evaluation engine or module 205 is called to determine if there are names (such as method names, variable names, etc.) that have been previously "seen" in one or more of the code files. For example, is a name unique or not. In some embodiments, when the name evaluation engine or module 205 finds that a name has been previously used, the name evaluation engine or module 205 suggests a different name as detailed herein.

In some embodiments, the code debugger 203 is a part of an integrated development environment (IDE) 207 that provides software developer tools including, but not limited to, a source code editor, build automation tools, and the debugger 203.

In some embodiments, the code debugger 203 is a service of a provider network 209. The provider network 203 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. Note that in some embodiments, the code file(s) 201 are stored by the provider network 209. These and other computing resources may be provided as services, such as a hardware virtualization service that can execute compute instances, a storage service that can store data objects, etc. For example, in some embodiments, one or more of the IDE 207 and code debugger 203 are services provided by the provider network 203. The users (or "customers") of provider networks may utilize one or more user accounts that are associated with a customer account, though these terms may be used somewhat interchangeably depending upon the context of use. Users may interact with a provider network across one or more intermediate networks (e.g., the internet) via one or more interface(s), such as through use of application programming interface (API) calls, via a console implemented as a website or application, etc. The interface(s) may be part of, or serve as a front-end to, a control plane of provider network that includes "back-end" services supporting and enabling the services that may be more directly offered to customers.

To provide these and other computing resource services, provider networks often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

FIG. 2 also illustrates an exemplary flow using the name evaluation engine/module 205. At circle 1, a user device 211 interacts with the code debugger 203 to request an evaluation of names in the one or more code file(s) 201 and one or more suggestions of a name using the name evaluation engine or module 205. In some embodiments, this request is automatically generated upon a user of the user device 211 utilizing a name (such as a method name, variable name, etc.) in source code that is being created. In other words, request for an on-the-fly (dynamic) evaluation of the name is made to the name evaluation engine or module 205 to determine if the name was previously seen in the code file(s) 201 and for one or more name suggestions when the name was previously seen.

In other embodiments, this request is sent by the user device 211 to evaluate the names used in the code file(s) 201 after source code editing. In other words, request for a static evaluation of the names by the name evaluation engine or module 205 to determine if the names were previously seen in the code file(s) 201 and for one or more name suggestions when a name was previously seen.

Depending upon the implementation, locations of the code file(s) 201, the number of names to suggest, etc. may be provided as a part of the request. For example, if the IDE 203 does not have the code file(s) 201 included as a part of a project a location of those files is provided.

At circle 2, the code files 201 are accessed by the name evaluation engine/module 205. In some embodiments, this access is to one or more databases of the provider network 209.

Figure 6:
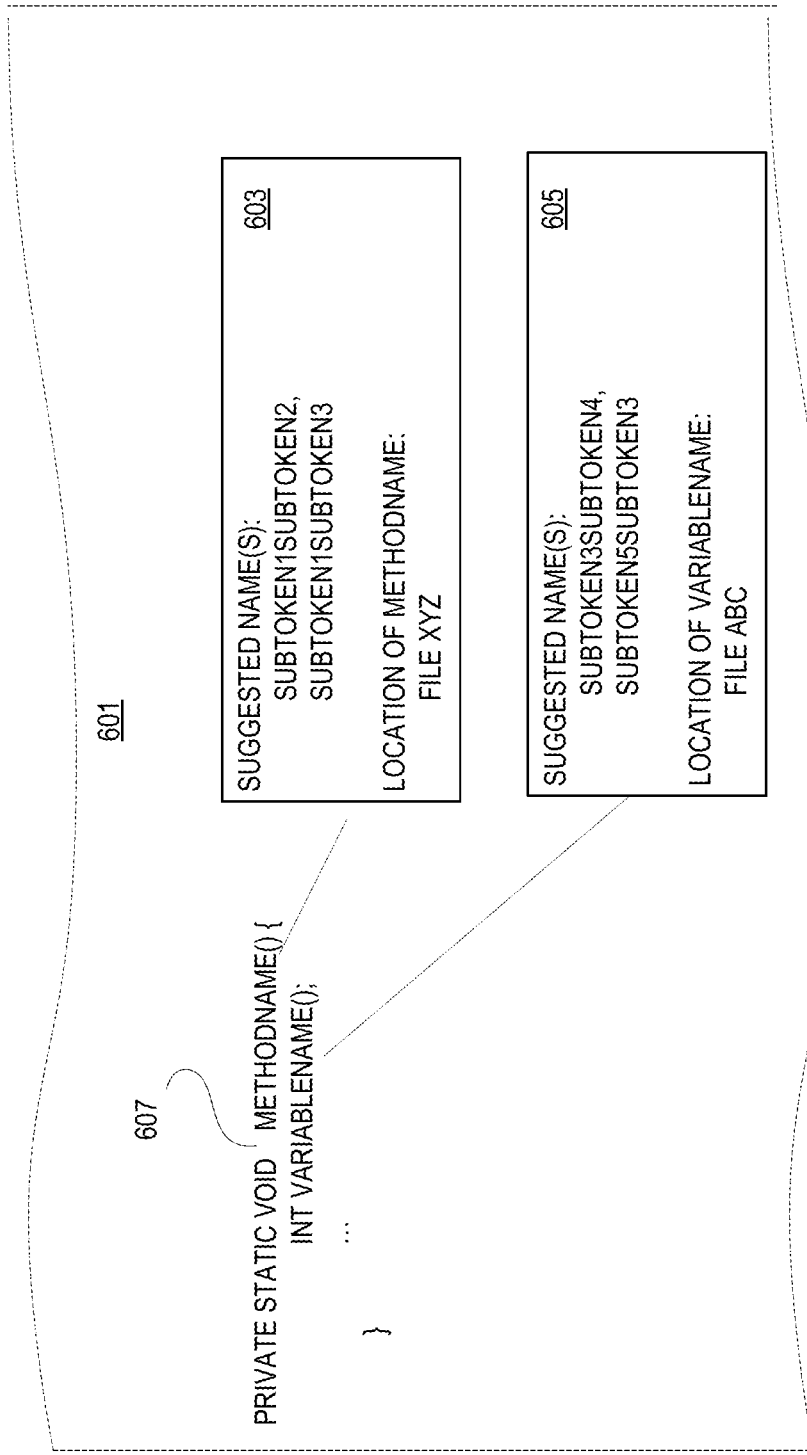
FIG. 6 illustrates embodiments of on-the-fly (dynamic) unseen name suggestion.
Figure 7:
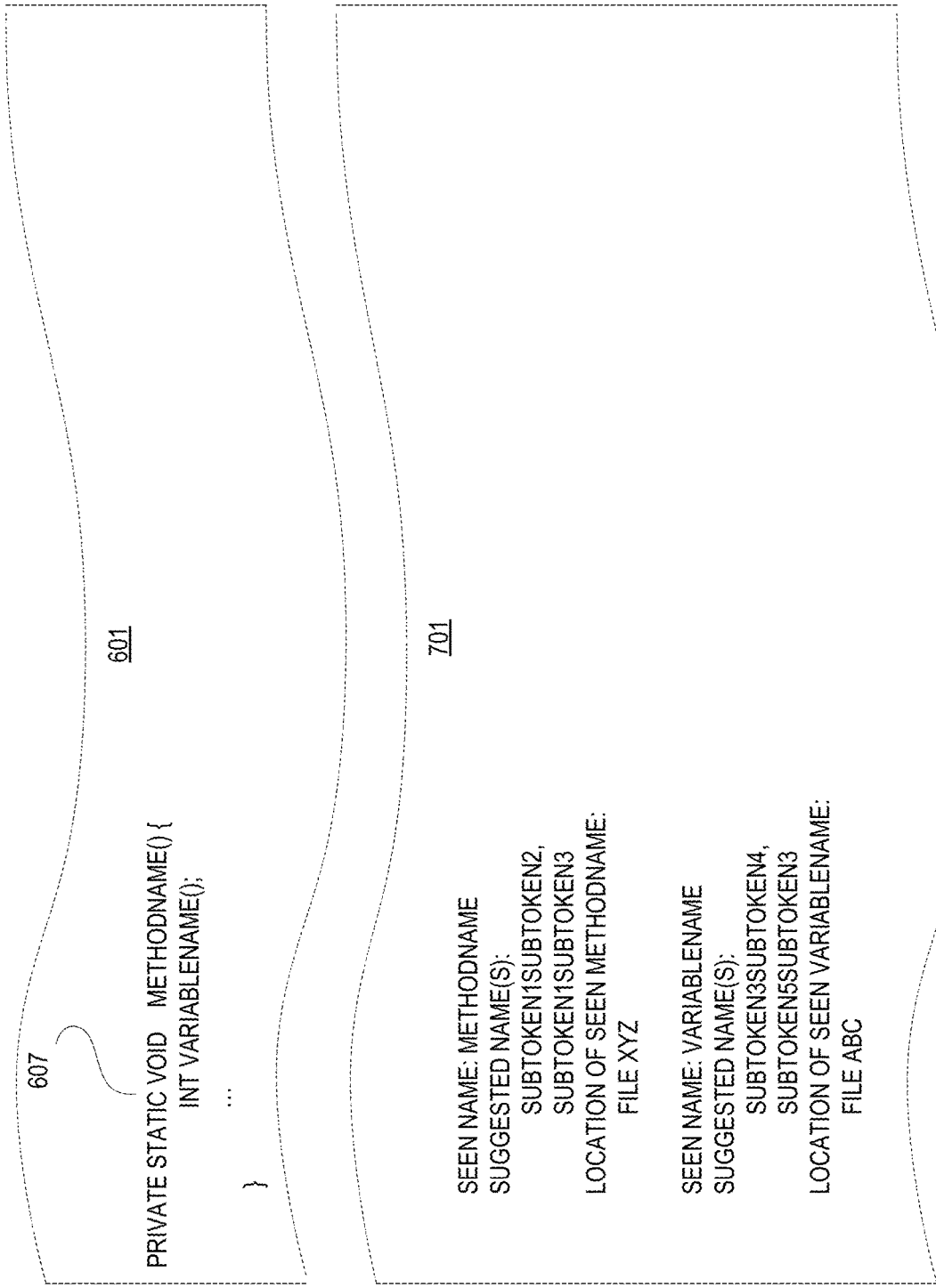
FIG. 7 illustrates embodiments of static name suggestion.

The name evaluation engine/module 205 performs the evaluation as dictated by the request type at circle 3 and provides a result to the user device 211 at circle 4. Examples of how the result may be provided to the user are illustrated in FIGS. 6 and 7.

Figure 3:
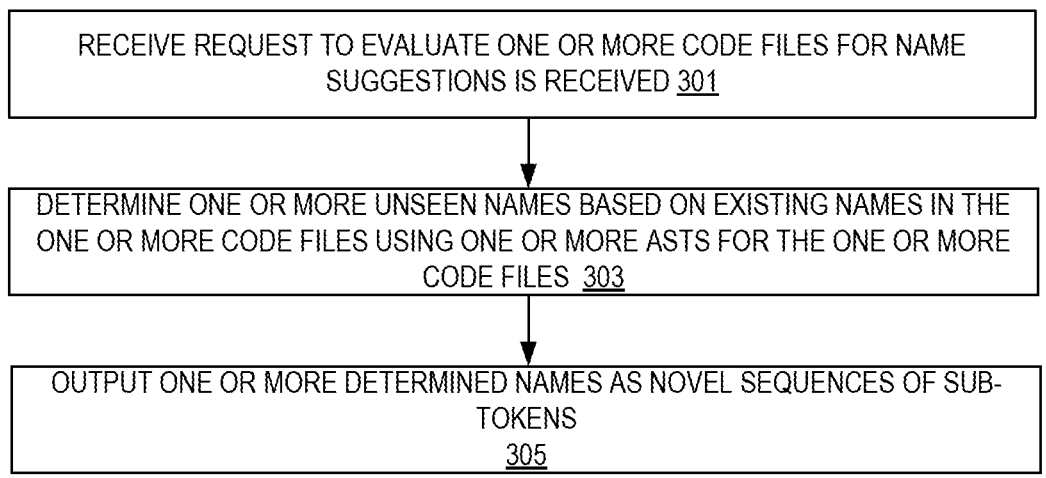
FIG. 3 illustrates embodiments of a method of providing names based on analysis of one or more code files.

FIG. 3 illustrates embodiments of a method of providing names based on analysis of one or more code files. In some embodiments, a name evaluation engine or module such as detailed above performs embodiments of this this method.

At 301, a request to evaluate one or more code files for name suggestions is received. Examples of dynamic and static requests were detailed above.

Figure 4:
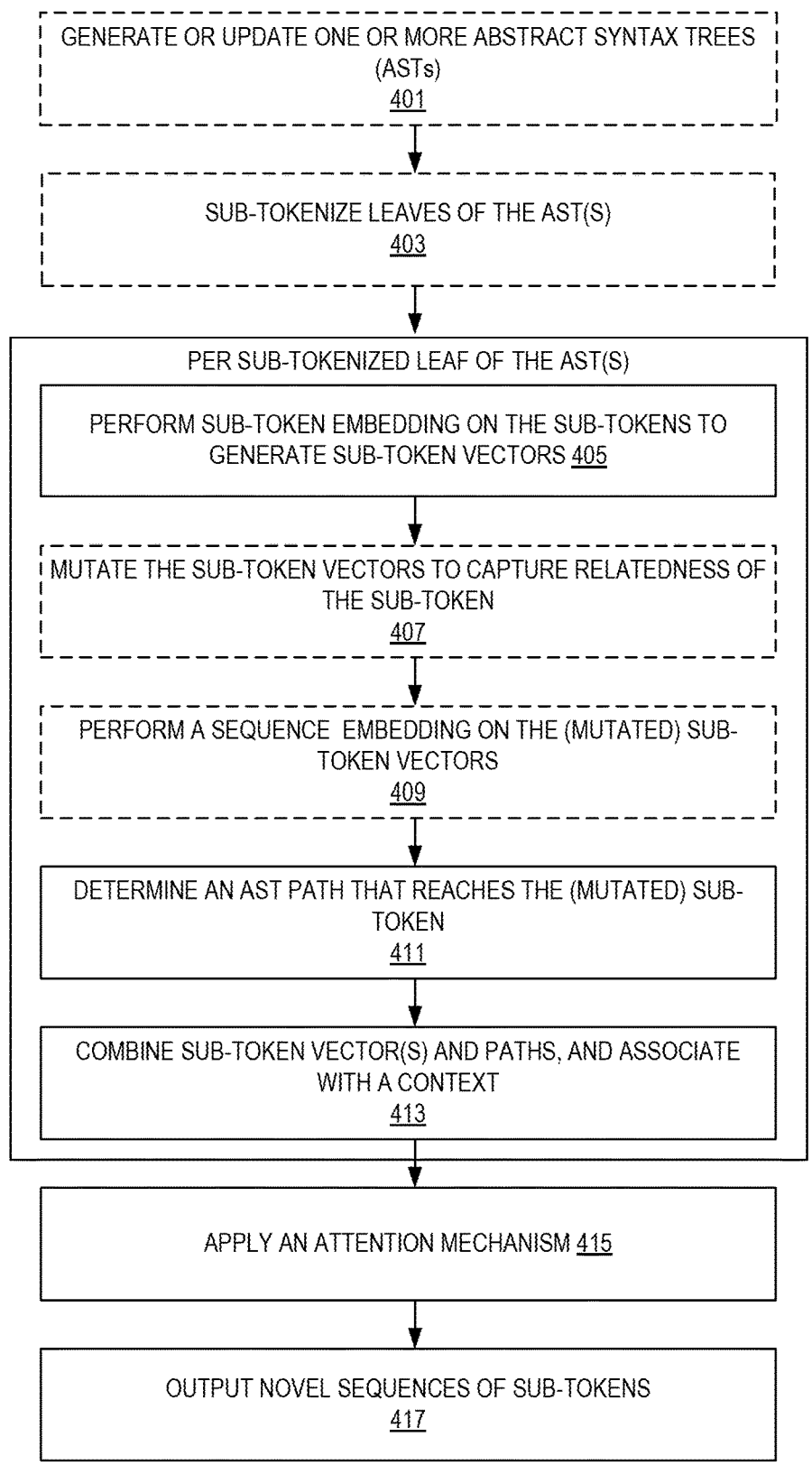
FIG. 4 illustrates embodiments of a method of suggesting names based on an evaluation of one or more code files.

A determination of one or more names based on existing names in the one or more code files is made at 303. This determination is made using one or more ASTs for the one or more code files. FIG. 4 illustrates a more detailed embodiment of determining the suggestion. Any determined name is a novel sequence of sub-tokens of existing names.

At 305, the determined name or names is/are output as name suggestions that comprise novel sequences of sub-tokens of existing names.

FIG. 4 illustrates embodiments of a method of suggesting names based on an evaluation of one or more code files. In some embodiments, this is method corresponds to at least action 303 of FIG. 3.

As noted above, the suggestion of names is made by using one or more ASTs of the one or more code files. In some embodiments, ASTs are generated and/or updated at 401. For example, if some instances, if name suggestion is not needed, ASTs would not be generated. However, if name suggestion has been previously performed, then the one or more ASTs may just need to be updated.

At 403, leaves of the AST(s) are sub-tokenized at 403. The leaves that are sub-tokenized are terminal nodes. For example, a name of "getUserName" would be sub-tokenized to get, User, and Name. Similar to the AST generation and/or update, sub-tokenization may already have been performed. In some embodiments, the size of the sub-tokenized leaves is the same across all leaves and padding is added when there are not enough sub-tokens.

Several activities are to be performed on per sub-tokenized leaf of the AST(s). First, a sub-token embedding is applied to each of the sub-tokens of the sub-tokenized leaf to generate sub-token vectors at 405. A sub-token embedding is a low-dimensional vector representation of the of an object (in this case, a sub-token). Similar sub-tokens are mapped to close vectors.

In some embodiments, the sub-token vectors are mutated to capture the relatedness to other sub-tokens at 407. For example, in some embodiments, a bidirectional recurrent layer (such as a long short-term memory (BiLSTM) recurrent neural network (RNN)) is used to perform this mutation.

In some embodiments, for example when a mutation has been performed, a sequence embedding is performed on the (mutated) sub-token vectors at 409. This can be a sub-token embedding or a LSTM sequence. In some instances, this is called a sequence embedding.

A determination of at least one path (start to end with the points of the path concatenated) in the AST that reaches the sub-tokens is made at 411. This determination is performed by an AST path embedding. In some embodiments, the embeddings detailed herein are pre-trained and in other embodiments are learned as part of the task for these sub-tokens. While this is illustrated as being serial, in some embodiments, this determination is made in parallel to 405-409.

The result of the path embedding and sub-token embedding(s) are combined to form a "long vector" and associated with a context vector at 413. The long vector is a concatenation of the AST path embedding and sub-token embedding(s). The context vector association shrink the long vector to a more manageable size. In some embodiments, a dense network (such as a fully connected feed forward network) performs this function.

The contexts are subjected to one or more attention mechanisms at 415. Examples of attention mechanisms include, but are not limited to applying a plurality of attention functions. In some embodiments, a hyperbolic attention function is applied to each context vector, followed by a rectifier activation function on the output of the hyperbolic activation function, and followed by one or more normalization functions (such as softmax) to the context vector. An overall dense network is then applied to the normalized context vectors to select an output. In some embodiments, attention mechanisms apply weights.

The resulting contexts are passed to a recurrent layer which outputs novel sequences of sub-tokens at 417.

Figure 5:
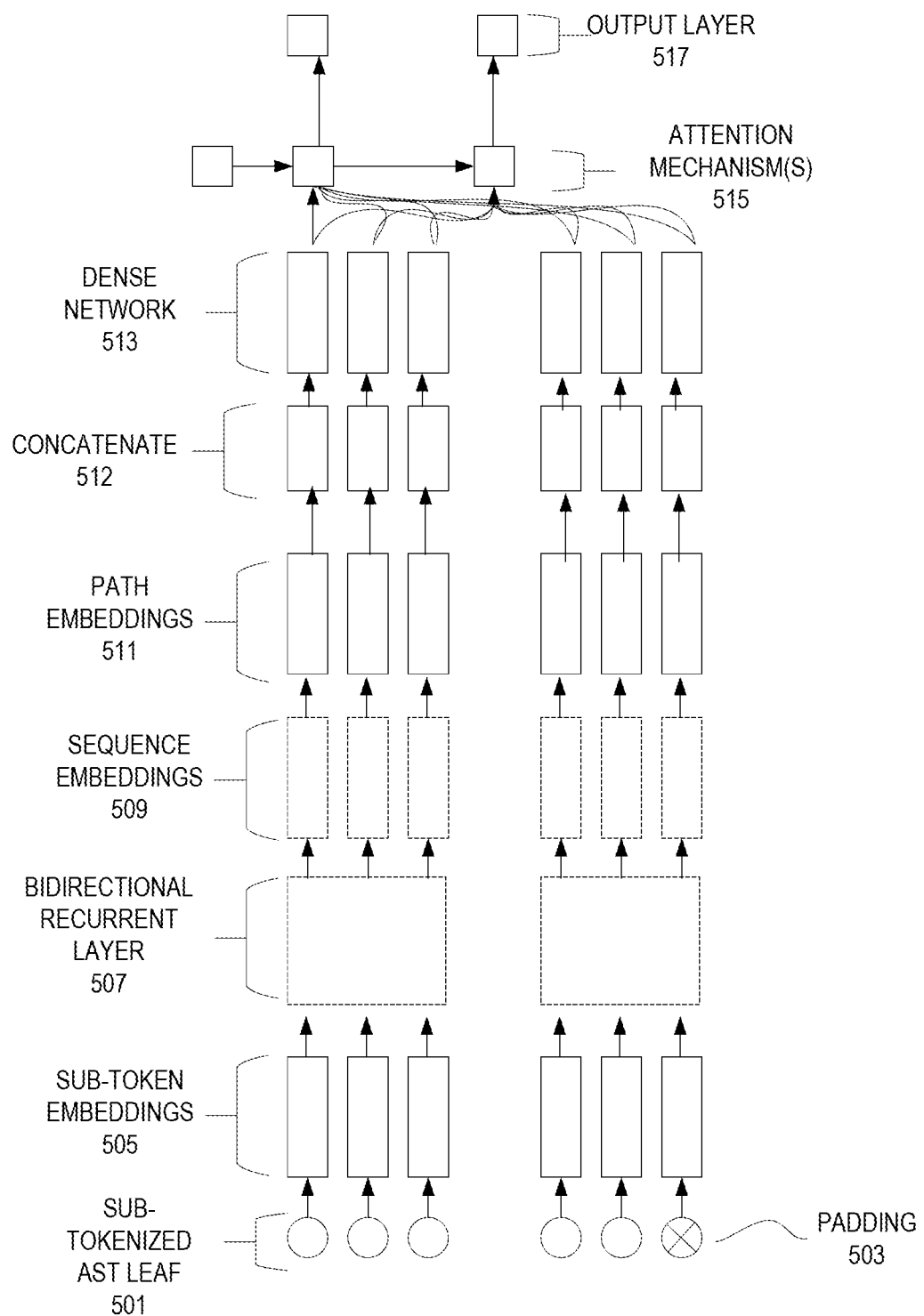
FIG. 5 illustrates embodiments of part of a name evaluation engine or module.

FIG. 5 illustrates embodiments of part of a name evaluation engine or module. For example, in some embodiments, this illustration corresponds to parts of the name evaluation engine or module 205.

As shown, a one or more sub-tokenized AST leaves 501 are input into sub-token embeddings 505 to generate sub-token vectors. For example, a leaf of "getUserName" would be sub-tokenized to get, User, and Name and be subjected to sub-token embeddings 505. In this illustration, one of the sub-tokenized leaves includes padding 503 as the sub-tokenization did not result in the correct size. For example, "UserDetail" would have sub-tokens of User and Detail, but does not have three sub-tokens such as the leaf of "getUserName."

In some embodiments, a bidirectional recurrently layer 507 (such as a long short-term memory (BiLSTM) recurrent neural network (RNN)) mutates the sub-token vectors to capture the relatedness to other sub-tokens. In some embodiments, the mutated sub-token vectors are subjected to a sequence embedding 509. The sequence embedding may be a sub-token embedding or a LSTM sequence.

One or more path embeddings 511 are applied to the sub-tokens to determine at least one path (start to end with the points of the path concatenated) in the AST that reaches the sub-tokens. A concatenation of the path and sub-token embeddings is performed using a concatenation function 512. Note, while shown in series, applying path embeddings 511 may be done in parallel to the sub-token embeddings 505, etc.

A dense network 513 associates each concatenated value with a context vector. In some embodiments, the dense network 513 is a fully connected feed forward network.

The contexts are subjected to one or more attention mechanisms 515. Examples of attention mechanisms include, but are not limited to applying a plurality of attention functions. In some embodiments, a hyperbolic attention function is applied to each context vector, followed by a rectifier activation function on the output of the hyperbolic activation function, and followed by one or more normalization functions (such as softmax) to the context vector. An overall dense network is then applied to the normalized context vectors to select an output. In some embodiments, attention mechanisms apply weights.

A recurrent output layer 517 takes the result after attention and generates novel sequences of sub-tokens.

FIG. 6 illustrates embodiments of on-the-fly (dynamic) name suggestion. In this example, a portion of a user interface 601 of an IDE is shown. A code snippet 607 is being written. As shown, the code snipped includes two names that may or may not be unique ("METHODNAME" and "VARIABLENAME"). As shown, the IDE is configured to utilize a name evaluation engine/module to generate suggested name(s) to potentially replace the illustrated names. For example, the IDE calls on the name evaluation engine/module to determine if either of these names has been used before and, if so, what other names may work based on the contextual use in the code snippet.

In this illustration, the IDE provides an indication 603 or 605 of not only unique names that are generated from sub-tokens, but a location of the name that is not unique. Note that the location of the seen name is not included in all embodiments. This indication 603 or 605 may be in the form of a traditional popup, a hoverbox, tooltip, etc.

FIG. 7 illustrates embodiments of static name suggestion. In this example, a portion of a user interface 601 of an IDE is shown. A code snippet 607 has being written. As shown, the code snipped includes two names that may or may not be unique ("METHODNAME" and "VARIABLENAME").

As shown, the IDE is configured to utilize a name evaluation engine/module to generate suggested name(s) to potentially replace the illustrated names after the code snippet is complete. For example, the IDE calls on the name evaluation engine/module to determine if either of these names has been used before and, if so, what other names may work based on the contextual use in the code snippet.

In this illustration, the IDE provides an indication 701 of not only unique names that are generated from sub-tokens, but a location of the name that is not unique. Note that the location of the seen name is not included in all embodiments. This indication 701 may be in the form of a file, a display, etc.

Figure 8:
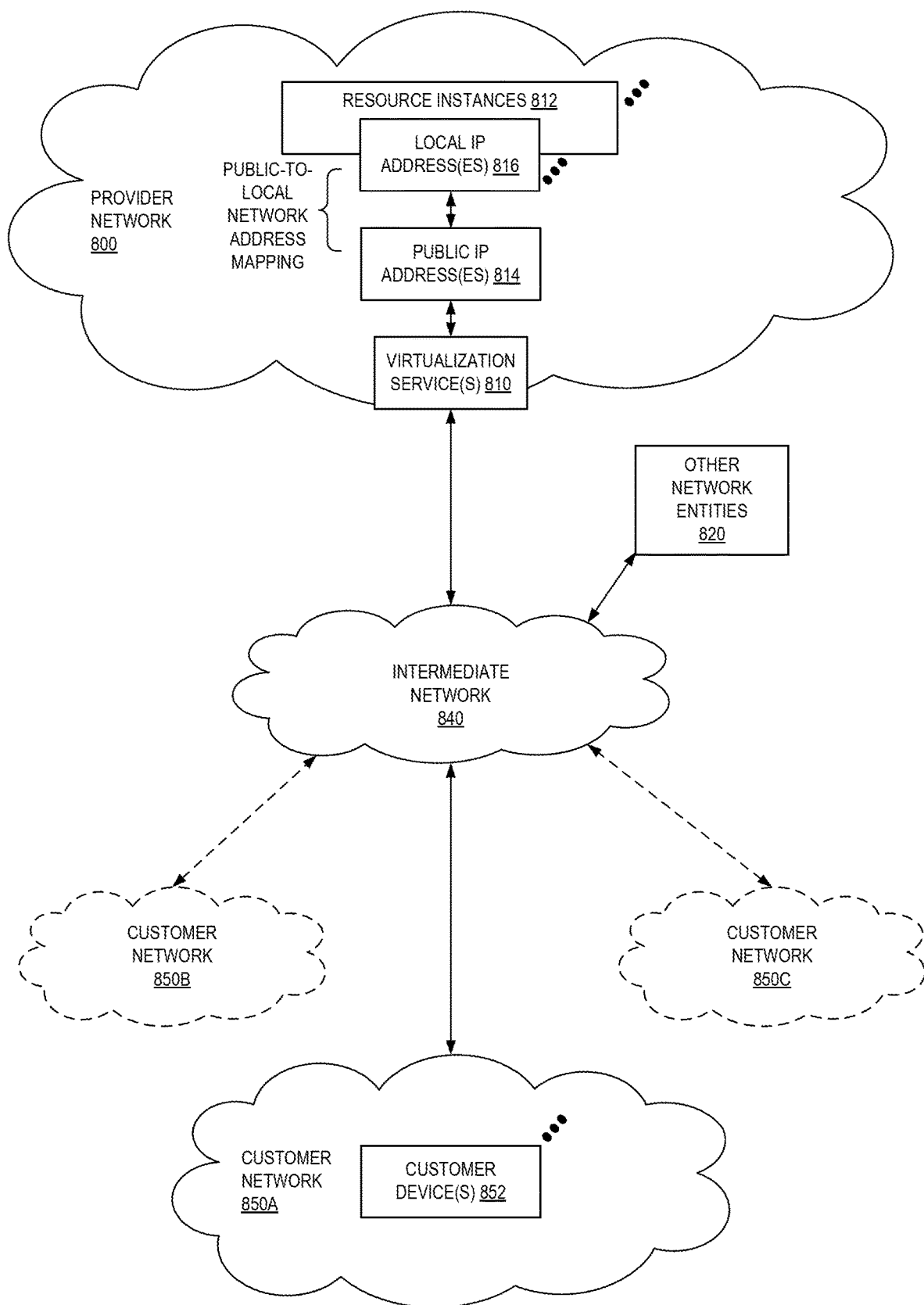
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
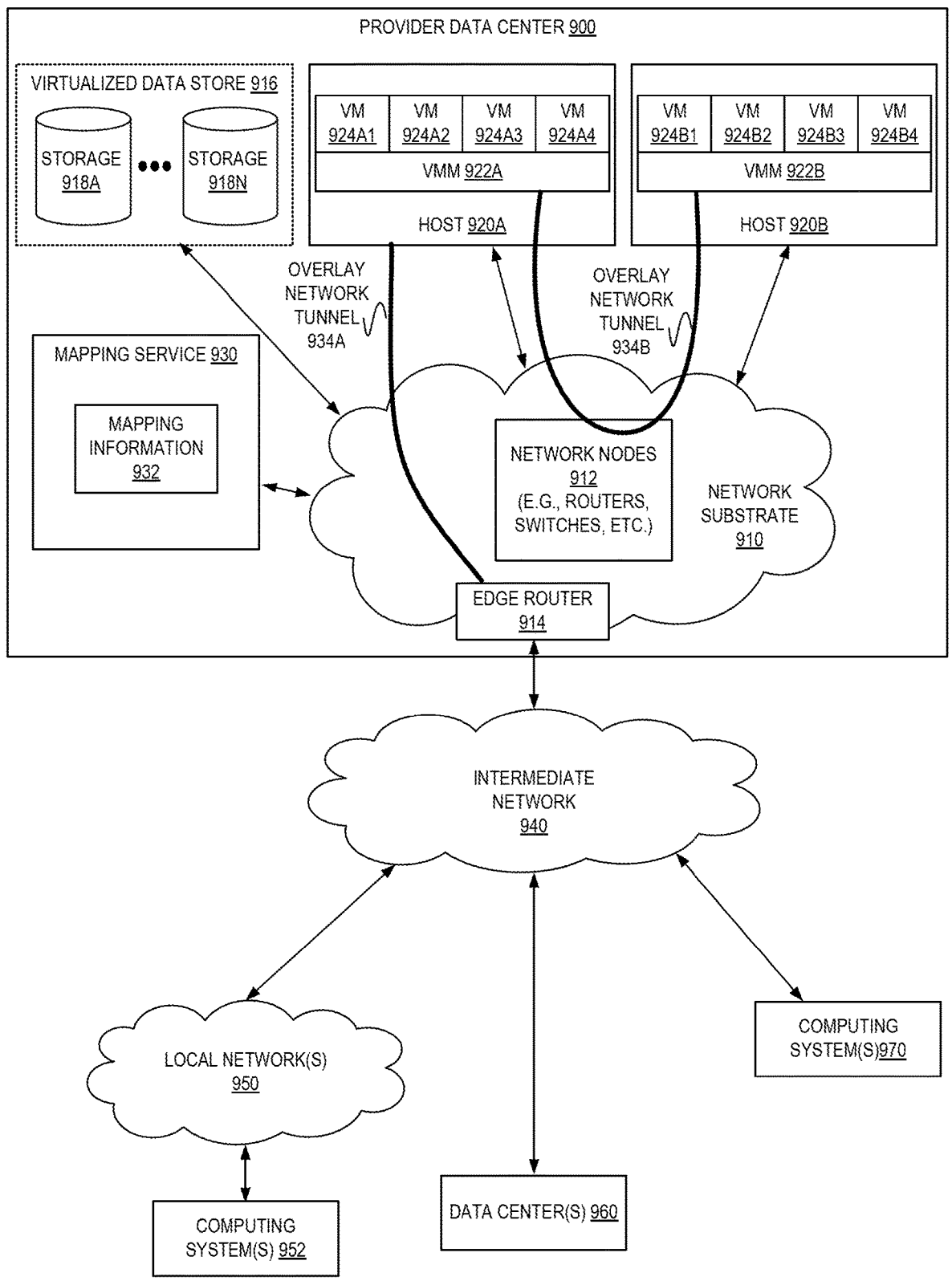
FIG. 9 illustrates an example data center that implements an overlay network on a network substrate using IP tunneling technology according to some embodiments.

FIG. 9 illustrates an example data center that implements an overlay network on a network substrate using IP tunneling technology, according to some embodiments. A provider data center 900 may include a network substrate that includes networking nodes 912 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 910 using tunnels. The IP tunneling technology may provide a mapping and encapsulating system for creating an overlay network on a network (e.g., a local network in data center 900 of FIG. 9) and may provide a separate namespace for the overlay layer (the public IP addresses) and the network substrate 910 layer (the local IP addresses). Packets in the overlay layer may be checked against a mapping directory (e.g., provided by mapping service 930) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 930) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 9, an example overlay network tunnel 934A from a virtual machine (VM) 924A (of VMs 924A1-924A4, via VMM 922A) on host 920A to a device on the intermediate network 950 and an example overlay network tunnel 934B between a VM 924A (of VMs 924A1-924A4, via VMM 922A) on host 920A and a VM 924B (of VMs 924B1-924B4, via VMM 922B) on host 920B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 9, at least some networks in which embodiments may be implemented may include hardware virtualization technology that enables multiple operating systems to run concurrently on a host computer (e.g., hosts 920A and 920B of FIG. 9), i.e. as virtual machines (VMs)

924 on the hosts 920. The VMs 924 may, for example, be executed in slots on the hosts 920 that are rented or leased to customers of a network provider. A hypervisor, or virtual machine monitor (VMM) 922, on a host 920 presents the VMs 924 on the host with a virtual platform and monitors the execution of the VMs 924. Each VM 924 may be provided with one or more local IP addresses; the VMM 922 on a host 920 may be aware of the local IP addresses of the VMs 924 on the host. A mapping service 930 may be aware of (e.g., via stored mapping information 932) network IP prefixes and IP addresses of routers or other devices serving IP addresses on the local network. This includes the IP addresses of the VMMs 922 serving multiple VMs 924. The mapping service 930 may be centralized, for example on a server system, or alternatively may be distributed among two or more server systems or other devices on the network. A network may, for example, use the mapping service technology and IP tunneling technology to, for example, route data packets between VMs 924 on different hosts 920 within the data center 900 network; note that an interior gateway protocol (IGP) may be used to exchange routing information within such a local network.

In addition, a network such as the provider data center 900 network (which is sometimes referred to as an autonomous system (AS)) may use the mapping service technology, IP tunneling technology, and routing service technology to route packets from the VMs 924 to Internet destinations, and from Internet sources to the VMs 924. Note that an external gateway protocol (EGP) or border gateway protocol (BGP) is typically used for Internet routing between sources and destinations on the Internet. FIG. 9 shows an example provider data center 900 implementing a network that provides resource virtualization technology and that provides full Internet access via edge router(s) 914 that connect to Internet transit providers, according to some embodiments. The provider data center 900 may, for example, provide customers the ability to implement virtual computing systems (VMs 924) via a hardware virtualization service and the ability to implement virtualized data stores 916 on storage resources 918A-918N via a storage service.

The data center 900 network may implement IP tunneling technology, mapping service technology, and a routing service technology to route traffic to and from virtualized resources, for example to route packets from the VMs 924 on hosts 920 in data center 900 to Internet destinations, and from Internet sources to the VMs 924. Internet sources and destinations may, for example, include computing systems 970 connected to the intermediate network 940 and computing systems 952 connected to local networks 950 that connect to the intermediate network 940 (e.g., via edge router(s) 914 that connect the network 950 to Internet transit providers). The provider data center 900 network may also route packets between resources in data center 900, for example from a VM 924 on a host 920 in data center 900 to other VMs 924 on the same host or on other hosts 920 in data center 900.

A service provider that provides data center 900 may also provide additional data center(s) 960 that include hardware virtualization technology similar to data center 900 and that may also be connected to intermediate network 940. Packets may be forwarded from data center 900 to other data centers 960, for example from a VM 924 on a host 920 in data center 900 to another VM on another host in another, similar data center 960, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 918A-918N, as virtualized resources to customers of a network provider in a similar manner.

Figure 10:
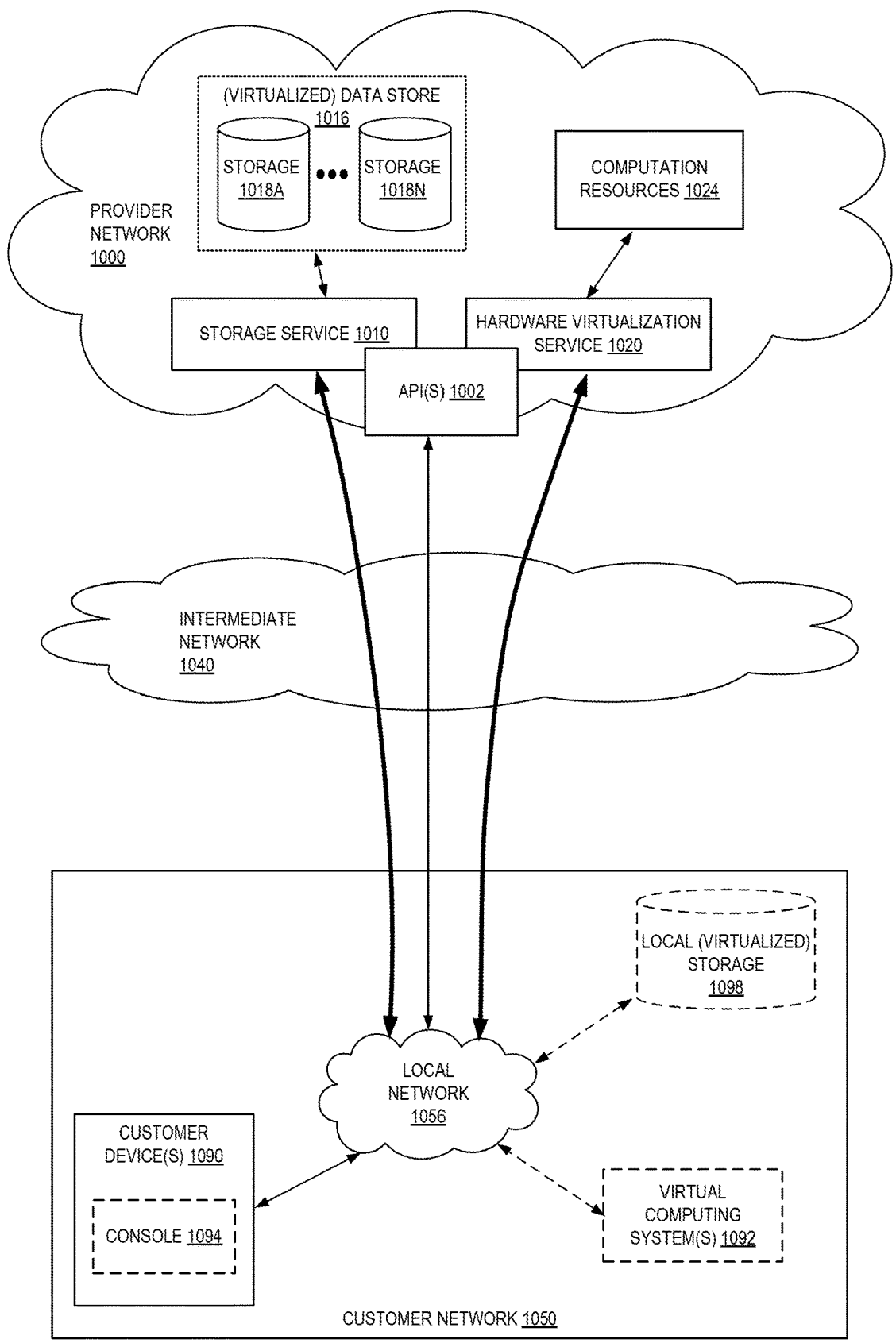
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Figure 11:
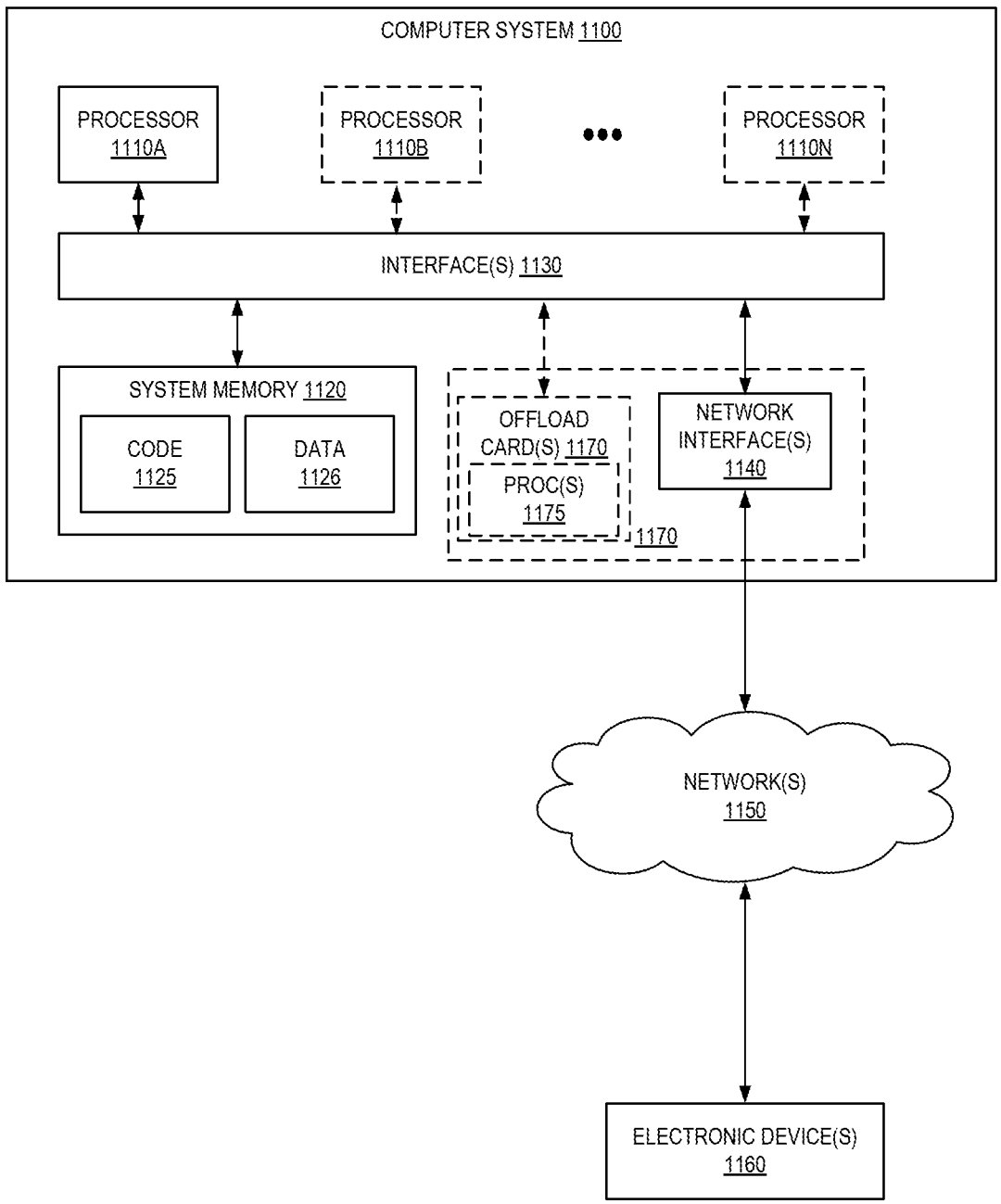
FIG. 11 is a block diagram illustrating an example computer system that may be used in some embodiments.

In some embodiments, a system that implements a portion or all of the techniques for suggesting names as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Figure 12:
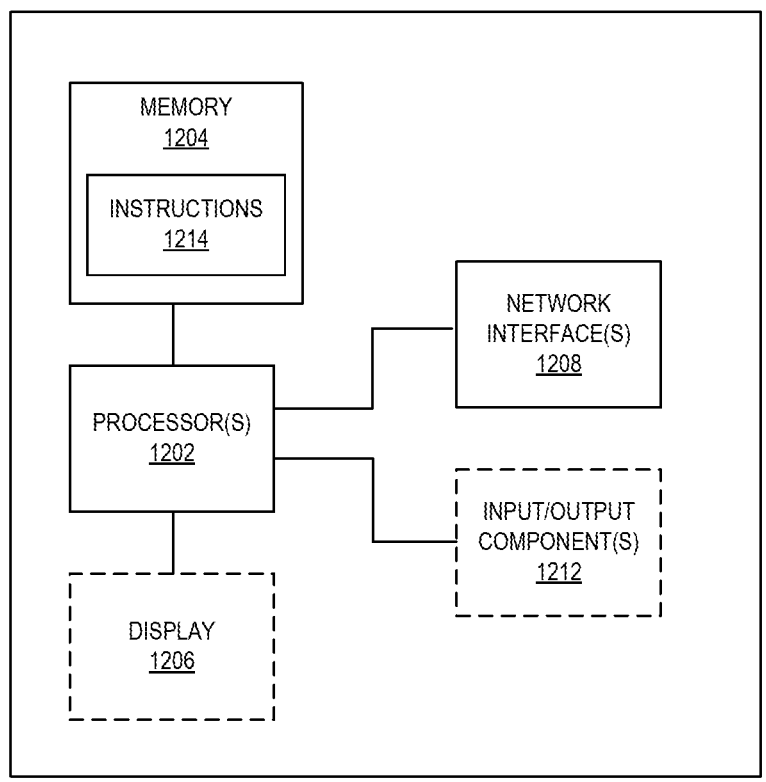
FIG. 12 illustrates a logical arrangement of a set of general components of an exemplary computing device that can be utilized in accordance with various embodiments.

FIG. 12 illustrates a logical arrangement of a set of general components of an example computing device 1200 such as the IDE and provider network detailed above. Generally, a computing device 1200 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1202 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1204) to store code (e.g., instructions 1214) and/or data, and a set of one or more wired or wireless network interfaces 1208 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1204) of a given electronic device typically stores code (e.g., instructions 1214) for execution on the set of one or more processors 1202 of that electronic device. One or more parts of various embodiments may be implemented using different combinations of software, firmware, and/or hardware.

A computing device 1200 can include some type of display element 1206, such as a touch screen or liquid crystal display (LCD), although many devices such as portable media players might convey information via other means, such as through audio speakers, and other types of devices such as server end stations may not have a display element 1206 at all. As discussed, some computing devices used in some embodiments include at least one input and/or output component(s) 1212 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 13:
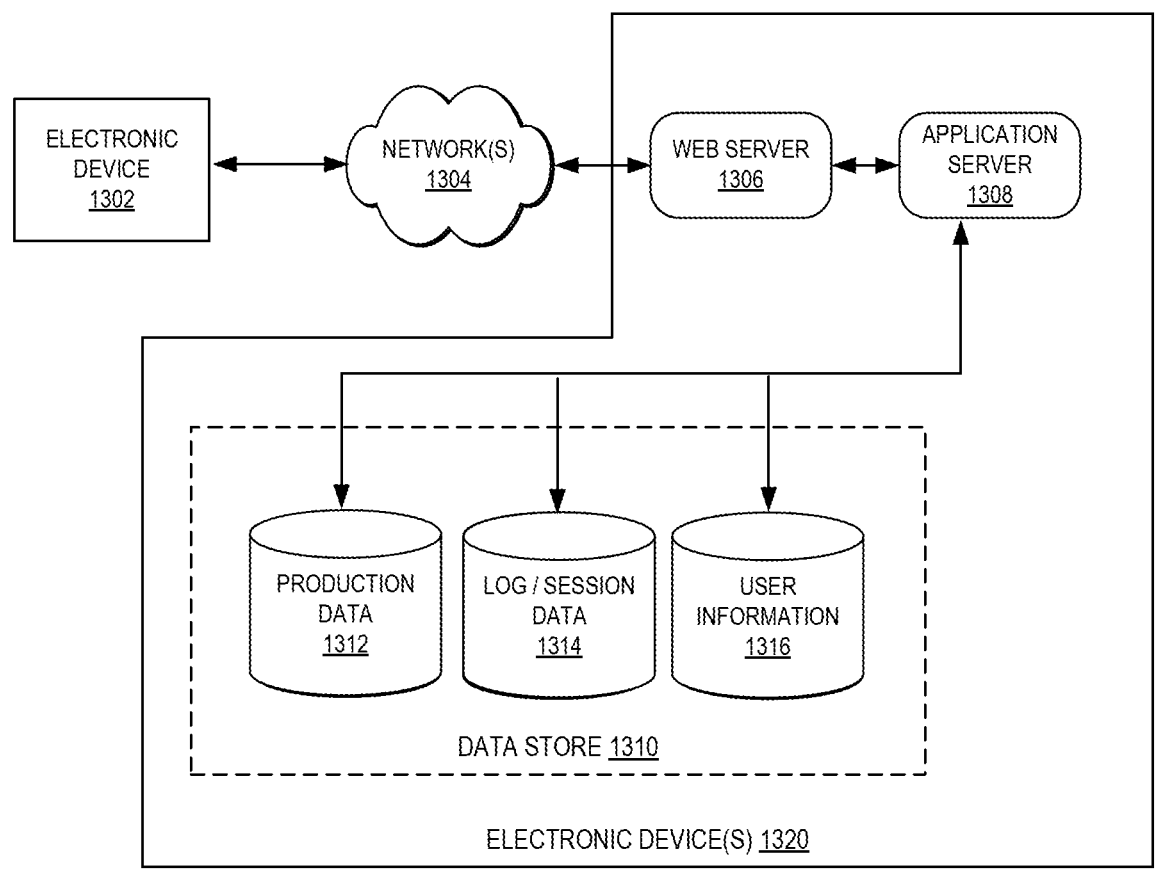
FIG. 13 illustrates an example of an environment for implementing aspects in accordance with various embodiments.

As discussed, different approaches can be implemented in various environments in accordance with the described embodiments. For example, FIG. 13 illustrates an example of an environment 1300 for implementing aspects in accordance with various embodiments. For example, in some embodiments provider network requests are HyperText Transfer Protocol (HTTP) requests that are received by a web server (e.g., web server 1306), and the users, via electronic devices, may interact with the provider network via a web portal provided via the web server 1306 and application server 1308. As will be appreciated, although a web-based environment is used for purposes of explanation, different environments may be used, as appropriate, to implement various embodiments. The system includes an electronic client device 1302, which may also be referred to as a client device and can be any appropriate device operable to send and receive requests, messages or information over an appropriate network 1304 and convey information back to a user of the device 1302. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1304 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1304 includes the Internet, as the environment includes a web server 1306 for receiving requests and serving content in response thereto, although for other networks an alternative device serving a similar purpose could be used, as would be apparent to one of ordinary skill in the art.

The illustrative environment includes at least one application server 1308 and a data store 1310. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1308 can include any appropriate hardware and software for integrating with the data store 1310 as needed to execute aspects of one or more applications for the client device 1302 and handling a majority of the data access and business logic for an application. The application server 1308 provides access control services in cooperation with the data store 1310 and is able to generate content such as text, graphics, audio, video, etc., to be transferred to the client device 1302, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1302 and the application server 1308, can be handled by the web server 1306. It should be understood that the web server 1306 and application server 1308 are not required and are merely example components, as structured code discussed herein can be executed on any appropriate device or host machine as discussed elsewhere herein.

The data store 1310 can include several separate data tables, databases, or other data storage mechanisms and media for storing data relating to a particular aspect. For example, the data store illustrated includes mechanisms for storing production data 1312 and user information 1316, which can be used to serve content for the production side. The data store 1310 also is shown to include a mechanism for storing log or session data 1314. It should be understood that there can be many other aspects that may need to be stored in the data store, such as page image information and access rights information, which can be stored in any of the above listed mechanisms as appropriate or in additional mechanisms in the data store 1310. The data store 1310 is operable, through logic associated therewith, to receive instructions from the application server 1308 and obtain, update, or otherwise process data in response thereto. In one example, a user might submit a search request for a certain type of item. In this case, the data store 1310 might access the user information 1316 to verify the identity of the user and can access a production data 1312 to obtain information about items of that type. The information can then be returned to the user, such as in a listing of results on a web page that the user is able to view via a browser on the user device 1302. Information for a particular item of interest can be viewed in a dedicated page or window of the browser.

The web server 1306, application server 1308, and/or data store 1310 may be implemented by one or more electronic devices 1320, which can also be referred to as electronic server devices or server end stations, and may or may not be located in different geographic locations. Each of the one or more electronic devices 1320 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1018A-1018N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to suggest one or more unseen names;
generating an abstract syntax tree corresponding to each of a plurality of source code files, the abstract syntax tree including a plurality of paths, each path defined by at least one terminal node;
sub-tokenizing leaves of the abstract syntax trees;
per sub-tokenized leaf of the abstract syntax trees,
performing sub-token embedding on the sub-tokenized leaves to generate at least one sub-token vector,
performing a path embedding on the sub-tokenized leaves to generate at least one abstract syntax tree path,
concatenating the at least one abstract syntax tree path and at least one sub-token vector to form a long vector, and
associating the long vector with a context;
applying an attention mechanism to all contexts to determine sub-tokens to be uniquely combined;
outputting a least one unique combination of determined sub-tokens as a suggested name.

2. The computer-implemented method of claim 1, wherein the request is made after the generation of the code file.

3. The computer-implemented method of claim 1, further comprising:
mutating the at least one sub-token vector using a bidirectional recurrent layer prior to performing the path embedding.

4. A computer-implemented method comprising:
receiving a request to suggest one or more names for a name in a code file;
determining one or more names based on existing names in one or more code files using one or more abstract syntax trees (ASTs) for the one or more code files, wherein the determining comprises applying an attention mechanism to a plurality of contexts generated from the one or more ASTs to determine sub-tokens to be uniquely combined, wherein the attention mechanism includes a hyperbolic attention function applied to each context, followed by a rectifier activation function on the output of the hyperbolic activation function, and followed by one or more normalization functions applied to each context; and
outputting the determined one or more names as a name suggestion that comprises novel sequences of sub-tokens of existing names of the one or more code files.

5. The computer-implemented method of claim 4, wherein determining one or more names based on existing names in the code file using one or more ASTs for the code file further comprises:
sub-tokenizing leaves of the abstract syntax tree; and
per sub-tokenized leaf of the abstract syntax tree,
performing sub-token embedding on the sub-tokenized leaves to generate at least one sub-token vector,
performing a path embedding on the sub-tokenized leaves to generate at least one abstract syntax tree path,
concatenating the at least one abstract syntax tree path and at least one sub-token vector to form a long vector, and
associating the long vector with a context.

6. The computer-implemented method of claim 5, further comprising:
mutating the at least one sub-token vector using a bidirectional recurrent layer prior to performing the concatenating.

7. The computer-implemented method of claim 4, wherein the request is made after the generation of the code file.

8. The computer-implemented method of claim 5, wherein the request is automatically generated upon an input of a name in the code file of the plurality of source code files in an integrated development environment.

9. The computer-implemented method of claim 5, further comprising:
outputting a location of a different use of the name in the code file.

10. The computer-implemented method of claim 4, further comprising retrieving a plurality of code files from a storage service to use in determining one or more unseen names based on existing names.

11. The computer-implemented method of claim 10, wherein the request includes a reference to the plurality of stored code files.

12. The computer-implemented method of claim 4, further comprising:
adding padding to one or more of the sub-tokens such that all sub-tokenized leaves are of the same size.

13. A system comprising:
a provider network including:
  storage for one or more code files; and
  a machine learning service implemented by one or more electronic devices, the machine learning service including instructions that upon execution cause the machine learning service to:
    receiving a request to suggest one or more names for a name in a code file stored in the storage;
    determining one or more names based on existing names in one or more code files using one or more abstract syntax trees (ASTs) for the one or more code files, wherein the determining comprises:
    sub-tokenizing leaves of the abstract syntax tree; and
    per sub-tokenized leaf of the abstract syntax tree, performing sub-token embedding on the sub-tokenized leaves to generate at least one sub-token vector,
    performing a path embedding on the sub-tokenized leaves to generate at least one abstract syntax tree path,
    concatenating the at least one abstract syntax tree path and at least one sub-token vector to form a long vector, and
    associating the long vector with a context;
    applying an attention mechanism to a plurality of contexts generated from the one or more ASTs to determine sub-tokens to be uniquely combined; and
    outputting the determined one or more names as a name suggestion that comprises novel sequences of sub-tokens of existing names of the one or more code files.

14. The system of claim 13, further comprising:
mutating the at least one sub-token vector using a bidirectional recurrent layer prior to performing the concatenating.

15. The system of claim 13, wherein the attention mechanism includes a hyperbolic attention function applied to each context vector, followed by a rectifier activation function on the output of the hyperbolic attention function, and followed by one or more softmax normalization functions applied to the context vector.

16. The system of claim 13, wherein the request is made after the generation of the code file.

17. The system of claim 13, wherein the request is automatically generated upon an input of a name in the code file of the plurality of source code files in an integrated development environment.

18. The system of claim 13, the request includes a reference to the plurality of stored code files.

* * * * *